(12) United States Patent
Halpern et al.

(10) Patent No.: US 9,819,380 B2
(45) Date of Patent: Nov. 14, 2017

(54) DOCKING STATION FOR PORTABLE ELECTRONIC DEVICE

(71) Applicant: Comprehensive Prospect Research, Waccabuc, NY (US)

(72) Inventors: Tim Halpern, South Salem, NY (US); Dana Halpern, South Salem, NY (US)

(73) Assignee: Comprehensive Prospect Research, Waccabuc, NY (US)

( * ) Notice: Subject to any disclaimer, the term of this patent is extended or adjusted under 35 U.S.C. 154(b) by 0 days.

(21) Appl. No.: 15/142,739

(22) Filed: Apr. 29, 2016

(65) Prior Publication Data

US 2016/0323007 A1    Nov. 3, 2016

Related U.S. Application Data

(60) Provisional application No. 62/154,338, filed on Apr. 29, 2015.

(51) Int. Cl.
*H04B 1/3888* (2015.01)
*H04M 1/02* (2006.01)
*H04M 1/04* (2006.01)
*H04M 1/18* (2006.01)

(52) U.S. Cl.
CPC ........ *H04B 1/3888* (2013.01); *H04M 1/0279* (2013.01); *H04M 1/04* (2013.01); *H04M 1/18* (2013.01)

(58) Field of Classification Search
CPC .............. H04B 1/3888; H04M 1/0206; H04M 1/0208; H04M 1/0249

See application file for complete search history.

(56) References Cited

U.S. PATENT DOCUMENTS

| 7,850,311 | B2 | 12/2010 | Rodriguez, Jr. et al. |
| 8,820,548 | B2 | 9/2014 | Wilson |
| 2006/0241830 | A1* | 10/2006 | Schmeisser ........... G06F 1/1626 361/752 |
| 2008/0168807 | A1 | 7/2008 | Dion et al. |
| 2009/0017883 | A1* | 1/2009 | Lin ........................ A45C 11/00 455/575.8 |
| 2011/0134601 | A1 | 6/2011 | Sa |
| 2012/0211454 | A1 | 8/2012 | Wilson |
| 2013/0063382 | A1* | 3/2013 | Feldstein .............. H04L 12/282 345/173 |

(Continued)

FOREIGN PATENT DOCUMENTS

| EP | 2043062 A | 4/2009 |
| EP | 2225970 A | 9/2010 |

(Continued)

*Primary Examiner* — Tuan Pham
(74) *Attorney, Agent, or Firm* — Leason Ellis LLP

(57) ABSTRACT

A docking station support system for a portable electronic device is disclosed. The docking station includes a housing with apertures to receive a portable electronic device and provide access to the touch sensitive display of such device. In certain embodiments, the docking station is invertible, and is supported by a leg or clips on top of, or at the edge of a surface, such as a table. The docking station can also be connected to a surface with hook and loop fasteners. The invention includes a gutter and spout system for catching food, beverages and other substances, and directing them away from the portable electronic device.

17 Claims, 9 Drawing Sheets

(56) References Cited

U.S. PATENT DOCUMENTS

2014/0247545 A1\* 9/2014 Richardson ........... G06F 1/1626
  361/679.3
2016/0043763 A1\* 2/2016 Richter ................. H04M 1/185
  455/575.8

FOREIGN PATENT DOCUMENTS

| JP | 2007-116317 A | 5/2007 |
| JP | 2010-161742 A | 7/2010 |
| JP | 2010-245972 A | 10/2010 |
| WO | WO-2008095219 | 8/2008 |
| WO | WO-2013/144351 A | 10/2013 |

\* cited by examiner

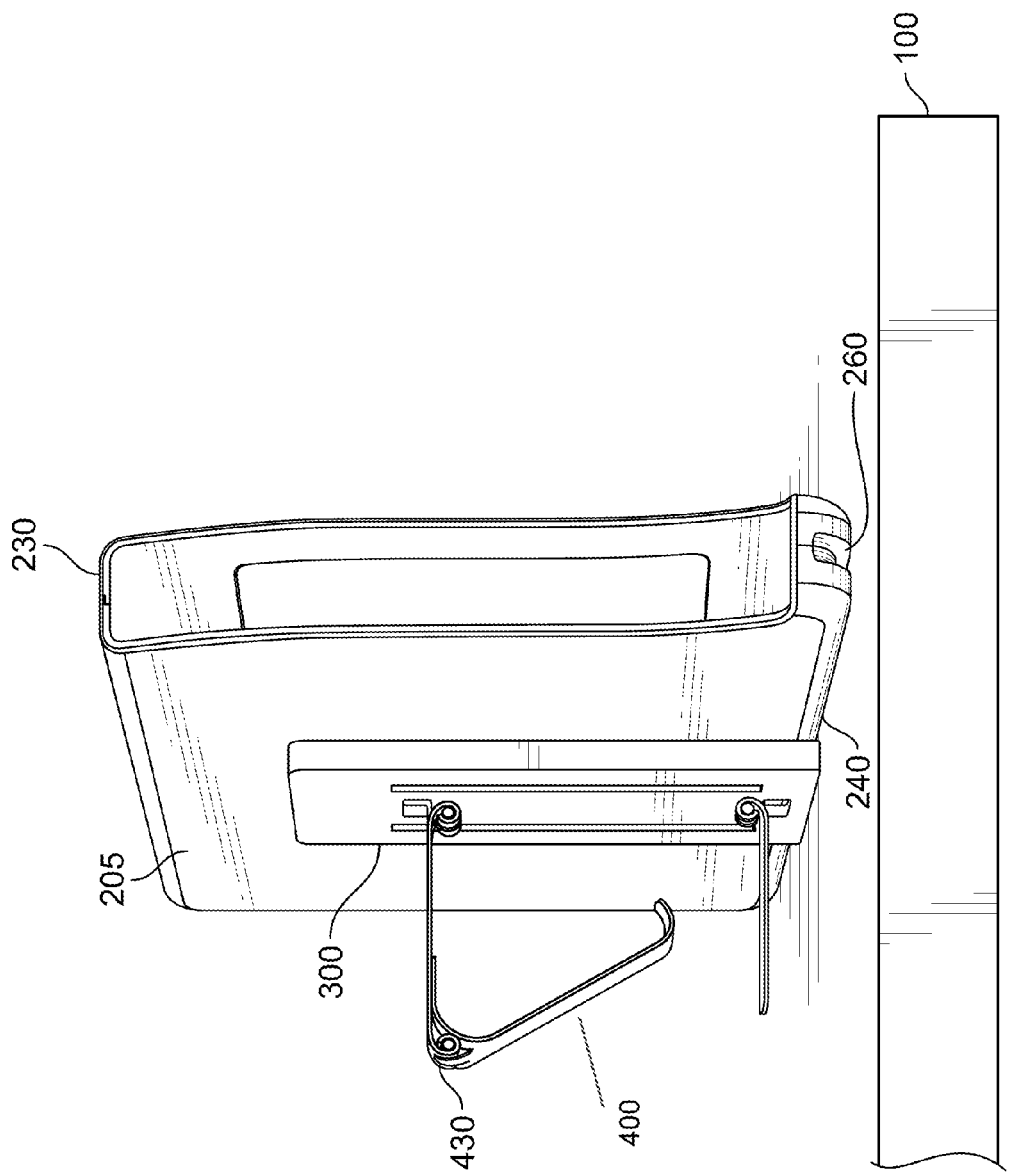

DOCKING STATION FOR PORTABLE ELECTRONIC DEVICE

CROSS-REFERENCE TO RELATED APPLICATIONS

This application claims the benefit of priority under 35 U.S.C. Section 119(e) of U.S. Application Ser. No. 62/154,338, filed Apr. 29, 2015, which is hereby incorporated by reference in its entirety.

FIELD OF THE INVENTION

The present invention relates to an accessible docking station for a portable electronic device that can sit on, or is mounted to, a table or other surface. In particular, the device can be invertible and include a gutter to direct substances, such as food or beverages, away from the portable electronic device within the docking station.

BACKGROUND OF THE INVENTION

Portable electronic devices, such as smartphones, have become an integral part of most people's lives. According to a February 2014 report of the Pew Internet Project (http://www.pewinternet.org/2014/02/27/part-1-how-the-internet-has-woven-itself-into-american-life/), 90% of American adults own a cell phone and 58% of American adults own a smartphone. This is a dramatic increase from 53% and 35%, respectively, in 2000.

Not only do the majority of Americans own portable electronic devices, recent studies suggest that Americans keep their devices within arm's reach at all times and read text messages within minutes of delivery (http://www.forbes.com/sites/cherylsnappconner/2013/11/12/fifty-essential-mobile-marketing-facts/).

Although there is a desire to have constant access to one's portable electronic device, accessing such devices during a meal, meeting, or conference can be difficult. If the device is in the user's pocket or purse, he or she must continually pull the device out to check it for calls, messages or emails. Storing the device in one's pocket or purse is undesirable because the user may not hear or feel the device's notification, particularly if the user has the device in a "silent" mode. This could result in delayed response time, or the user missing something important, such as an urgent call. Furthermore, periodically pulling out one's device can be distracting to others. Thus, there exists a need for a product that can hold a portable electronic device and allow the user to access it in an easy way.

Setting one's device on a table during a meal, meeting or conference is not desirable for a number of reasons. First, food or drink can easily be spilled on the device when it is sitting on the table. Most devices are not waterproof, and can be damaged or become sticky after spilled on. Second, the portable device can be stolen if it is sitting on top of the table. Third, setting the device on the table allows everyone around the user to see the device and its notifications. If the user is waiting for a personal or private message, he or she may not want others at the table to be able to see the device. Therefore, it would be an improvement in the art to have a docking station that can be placed on, or attached to a table or surface, which allows the user access to the device in a safe and private way.

A restaurant, for example, may want to provide docking stations for its patrons and advertise itself as a tech-friendly establishment. Because of the number of tables a restaurant or convention center may have, it would be beneficial if the docking station was easy to manufacture, cost effective and durable. Other docking stations that exist in the art, such as those disclosed in United States Patent Application Publication No. 2011/0134601, are complex and are directed toward creating a charging or information transfer station, rather than ease of access to a touch sensitive display. Such devices can have high manufacturing costs. These costs are ultimately passed on to the consumer. These types of prior art docking stations also contain electronics, which makes cleaning such stations difficult. There is a need in the art for a low-cost docking station that is durable and can easily be cleaned.

In restaurants, or other spaces that hold meetings or conferences, tables are often moved and broken down to accommodate varying sized parties. Thus, any docking station must be moveable to allow for optimal placement during seating. Permanent docking stations are not desirable because they can damage the table's surface and interfere with table storage. A need exists for removable docking stations that can be placed on a surface according to a desired need.

Moreover, device users may want to choose where on the table or surface to connect their devices. Some users may prefer the docking station to prop the device up on the table. Others may prefer a more discrete approach, where the docketing station is connected to the edge of the table. Or, users may want to start with the device on the table, and then move it so that it is connected to the edge of the table to make space on the table's surface for food or papers. Prior art products, such as those by ED Origin (http://www.ed-origin.com/product.asp?classid=37) or Shenzhen Puhua Arts & Crafts Co. (http://phchina.en.alibaba.com/collection_product/cellphone_rack/1.html), are only configured to support a device on a table top. Therefore, it would be beneficial if one docking station product allowed for both table top and table edge connection, and could be alternated easily between the two orientations.

SUMMARY OF THE INVENTION

In accordance with one aspect of the present invention, a support sufficiently sized and shaped to house a portable electronic device having a touch sensitive display is disclosed. The support has a housing with an aperture sized and shaped to receive the portable electronic device, and at least a second aperture sized and shaped to provide access to the touch sensitive display when the portable electronic device is in the housing. The housing of the support further has a gutter that provides a fluid channel, and at least one leg extending from the housing to support the housing relative to a surface.

In other aspects of the invention, the housing can have a spout at the end of the gutter to direct fluid out of the fluid channel and away from the apertures of the housing. The gutter may also extend along the length of the top surface of the housing.

In one embodiment, the leg discussed above is a clip, which includes opposing surfaces that are arranged to detachably connect the housing to a surface in a first orientation. A first orientation includes positioning the top surface of the housing substantially level with or below the surface it is connected to. In another embodiment, the leg is a clip and the opposing surfaces of the clip are arranged to support the housing upon a surface in a second orientation. A second orientation includes positioning the second aperture at an obtuse angel relative to the surface of the surface.

The clip optionally has two conditions or states: a first state in which the clip extends away from the housing and a second in which the clip is in a storage configuration adjacent to the housing. A clip so-configured to have more than one condition or state can further have hinges along its length to enable retraction or folding of the clip about the hinges.

Another aspect of the invention disclosed is where the leg consists of a first and second clip, where at least one edge of each clip is narrower than the center of each clip. When such clips are used, a first and second clip holder is connected to the back of the housing. Each clip holder consists of two sides opposite one another with an opening between that is adapted to allow the narrower edges of the first and second clips to pass through, but secure the center of the first and second clip. The first and second clips may be secured by aligning a raised portion of the clip holders with a depressed portion of the clips. When the raised portion and depression are aligned, they engage and secure the clips in the clip holders.

In a further embodiment, a support that is sufficiently sized and shaped to house a portable electronic device having a touch sensitive display is disclosed. The support has a housing with an aperture sized and shaped to receive the portable electronic device, and at least a second aperture sized and shaped to provide access to the touch sensitive display when the portable electronic device is in the housing. The housing further has at least one clip with opposing surfaces that extends from the housing. The clip can detachably connect the housing to a surface in a first orientation, or can be arranged where the opposing surfaces of the clip support the housing upon a surface in a second orientation. The clip further can be collapsible so as to transition from one condition or state to another. The first orientation can include where the top surface of the housing is substantially level with or below the surface it is connected to. The second orientation can include a position where the second aperture is at an obtuse angle relative to the surface of the surface. This embodiment may contain a gutter that forms a fluid channel and a spout at the end of the gutter to direct fluid out of the fluid channel. The clip in this embodiment may be configured, as discussed above, as a first and second clip each with at least one edge narrower than the center of each clip. When the clips are in this configuration, the support has a first and second clip holder. The clip holders consist of opposing sides with an opening between the sides that is adapted to fit the narrower edge of the first and second clip, but secure the wider center of the first and second clips. This clip configuration may also include at least one raised portion on the clip holders, and at least one depression on the clips, as described above.

In accordance with yet another embodiment, a support sufficiently sized and shaped to house a portable electronic device having a touch sensitive display is disclosed. The support has a housing with an aperture sized and shaped to receive the portable electronic device, and at least a second aperture sized and shaped to provide access to the touch sensitive display when the portable electronic device is in the housing. The housing of the support further has a gutter that provides a fluid channel, a first fastener component connected to the exterior of the housing and providing a first set of hook and loops, and a second fastener component attachable to a surface and providing a second set of hook and loops to fasten to the first set. This embodiment may include a spout at the end of the gutter to direct fluid out of the fluid channel and clear of the apertures.

These and other aspects, features and advantages shall be apparent from the accompanying drawings and description of certain embodiments of the invention.

BRIEF DESCRIPTION OF THE DRAWINGS

FIG. 2 is a rear perspective view of the docking station according to one embodiment of the invention;

FIG. 4A is a perspective view of a clip in a collapsible position that can be used with one embodiment of the invention;

DETAILED DESCRIPTION OF CERTAIN EMBODIMENTS OF THE INVENTION

Figure 1:
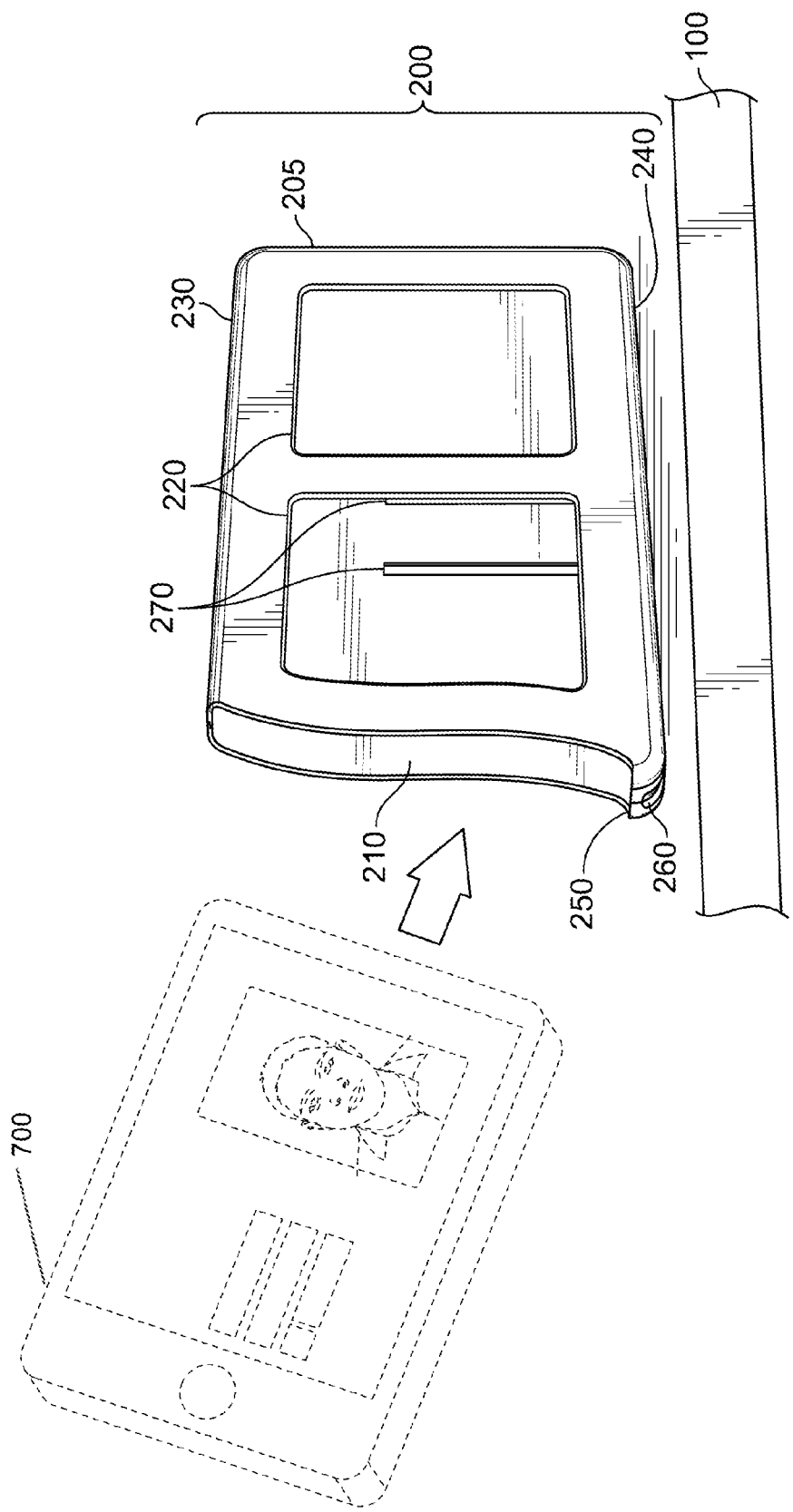
FIG. 1 is a front perspective view of the docking station according to one embodiment of the invention.
Figure 1A:
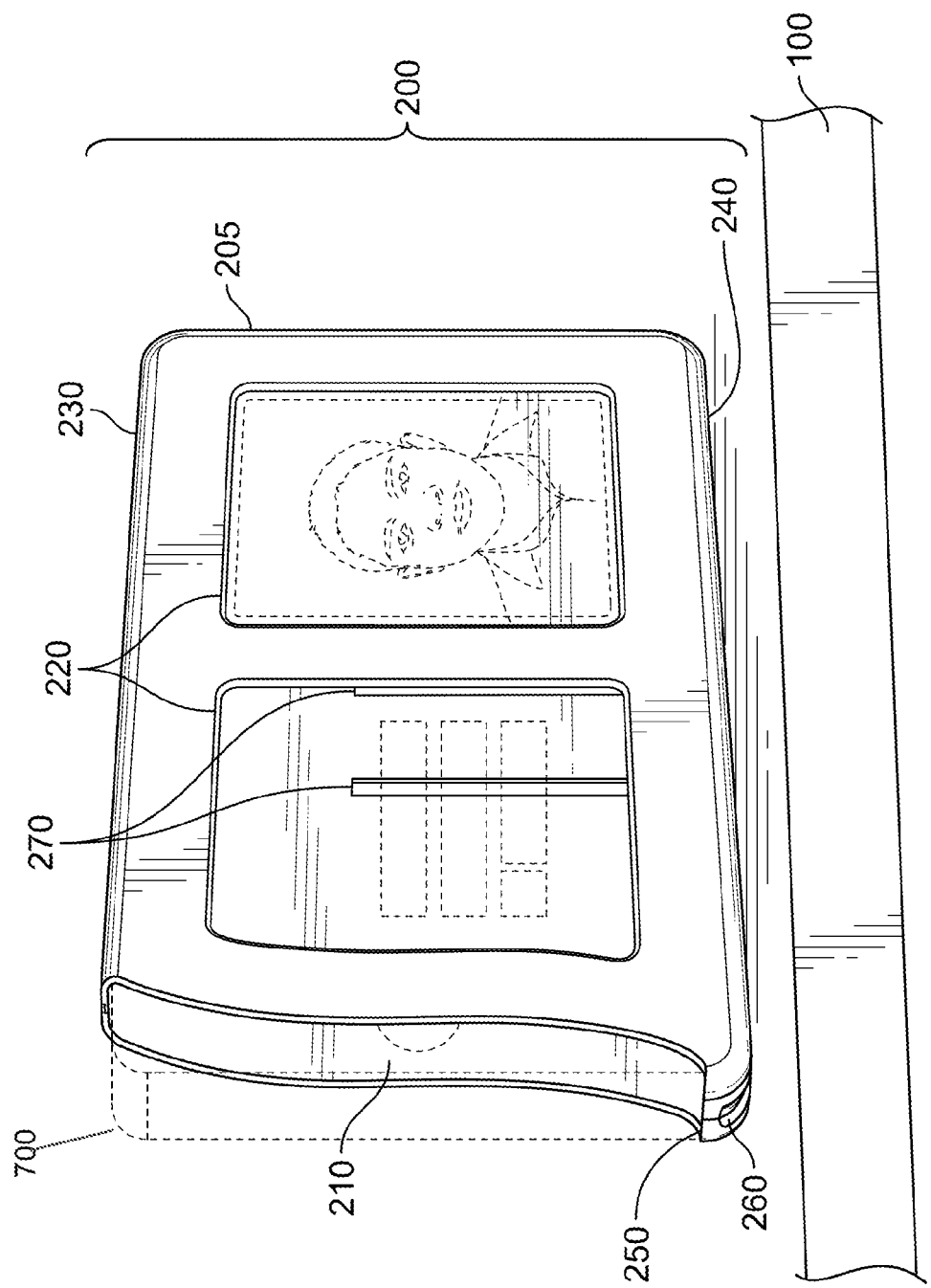
FIG. 1A is a front perspective view of the docking station according to one embodiment of the invention with a portable electronic device shown positioned in the docking station.

Referring to FIGS. 1, 1A and 2, a support 200, which will be referred to herein as a docking station 200, is disclosed. The docking station 200 is designed to hold a portable electronic device 700 with a touch sensitive display, such as a smartphone, in a housing 205. As shown in FIGS. 1 and 1A, the docking station 200 has a housing 205 with an aperture 210 on one side that is sized and shaped to receive a portable electronic device. To allow access to the touch sensitive display of the device, the housing 205 has at least a second aperture 220 in the front of the housing. In a preferred embodiment, the housing 205 has a second and third aperture 220, as shown in FIG. 1. Two apertures 220 on the front of the housing maximize access and visibility of the touch sensitive display, while providing support so that the portable electronic device does not fall out of the housing through the apertures. The apertures 220 are preferably open, rather than enclosed by clear glass or plastic, to allow access to the touch sensitive display.

Figure 4:
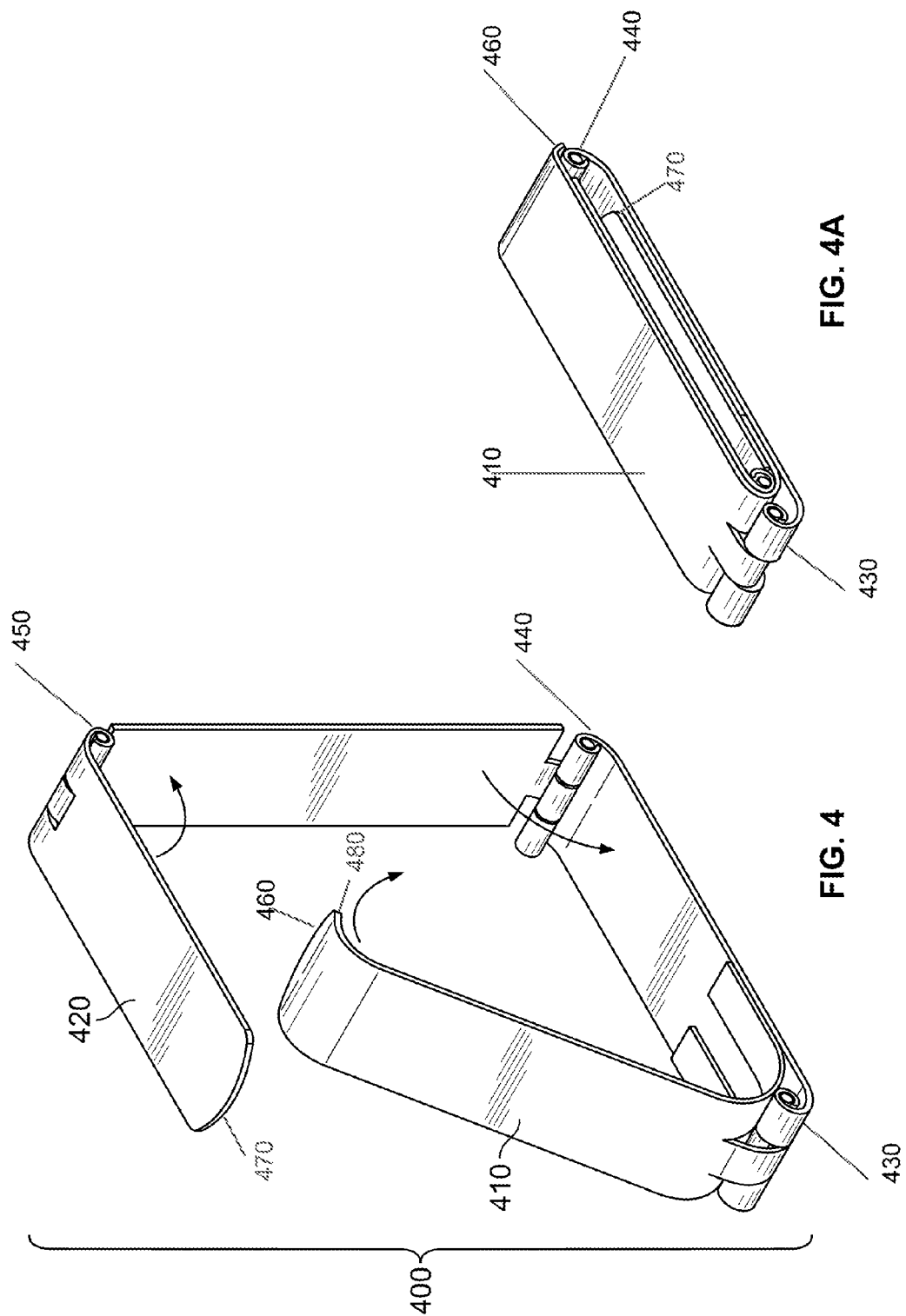
FIG. 4 is a perspective view of a clip that can be used with one embodiment of the invention.
Figure 5:
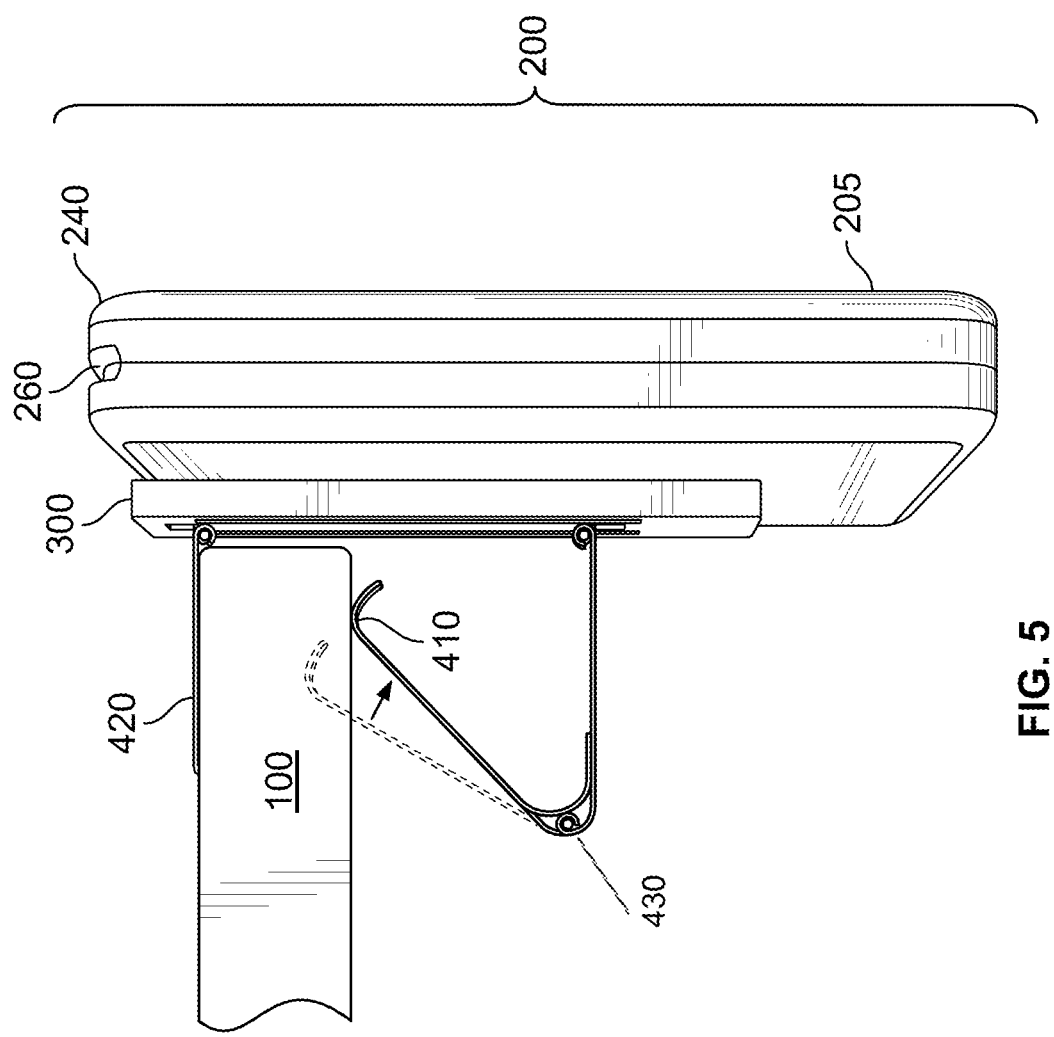
FIG. 5 is side perspective view of the docking station according to a second embodiment of the invention.

In a first embodiment, the docking station 200 is invertible, and can be attached to a surface or sit on a surface 100, depending on the desired use. The docking station 200 includes a first clip 400, as shown in FIGS. 2, 4 and 5, which extends from the housing to support the housing relative to a surface 100. FIG. 5 shows a first orientation, where the clip has opposing surfaces 410 and 420, which are arranged to detachably connect the docking station 200 to the surface 100. In this first orientation, the housing 205 can be positioned such that its top surface 240 is substantially level with, or below, the surface 100 it is connected to. It may be desirable to have the first orientation at or below the surface 100 so that it does not interfere with any activities that are taking place on the table, such as eating. Additionally, when in such a first orientation, the screen of the portable electronic device is obscured from the vision of those around the user. This provides privacy to the user, who may not want others to see his or her portable electronic device.

Any clip known to a person of ordinary skill in the art may be suitable for this application. In one preferred embodiment, a leaf spring clip is used, where one side 410 bends to the center of the clip to secure the surface 100 between the two ends 410 and 420 of the clip 400. The bending of clip 400 is demonstrated by the arrow in FIG. 5. FIG. 4 depicts the leaf spring clip 400 when it is removed from the housing. One end 420 of the clip is straight, while the other end 410 is curved 480 to allow easy application of the docking station 200 to the surface 100 and removal. The curved edge 480 of the clip is further advantageous because the curvature prevents the clip from scratching the table. The clip 400 is preferably made out of metal for durability. However, it is appreciated that any bendable material with sufficient durability could be used.

In certain embodiments, clip 400 is collapsible. As shown in FIGS. 2, 4 and 4A, one embodiment of the clip 400 includes three hinges 430, 440, 450 to allow the clip to collapse or retract. In this embodiment, the clip remains open in a first state in which the clip extends away from the housing by virtue of tension, such as in a spring loaded clip or comparable mechanism. When desired, the user can open and close the collapsible clip. When the clip is in its collapsed condition or state, as shown in FIG. 4A, tension is maintained by the hinge, which keeps the clip closed and enables the clip to be stored in a position adjacent to the housing, such that the free ends 460 and 470 of the clip are tucked-in close to the housing.

Figure 3:
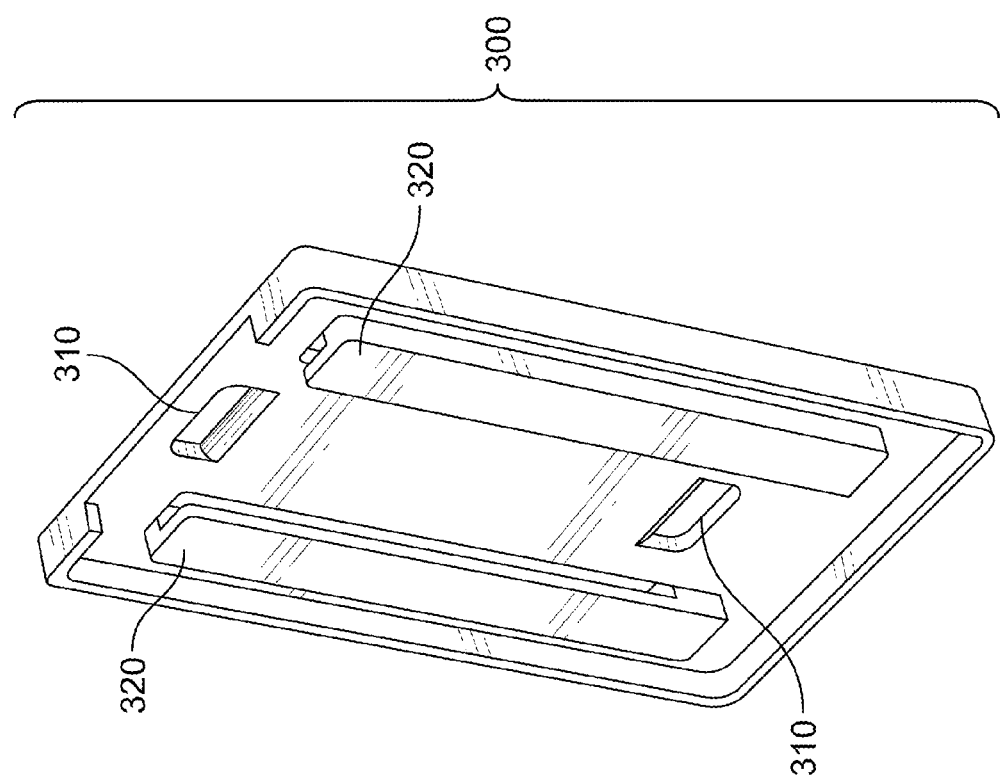
FIG. 3 is a perspective view of the clip holder according to one embodiment of the invention.

The clip 400 can be attached directly to the housing 205, or to a clip holder, as depicted in FIG. 3. In one embodiment, the clip holder 300 is attached to the housing 205 by engaging a raised portion of the housing 270 within openings 320 on the clip holder 300. Prior to attaching the clip holder 300 to the housing 205, the clip 400 is inserted and secured through a first and second aperture 310 in the clip holder 300. This connection configuration is preferable because it is easy to assemble and manufacture. It is appreciated that this is just one embodiment showing how to attach the clip 400 to the housing 205, and other suitable attachment methods may be used.

Referring to FIGS. 1-2, the docking station 200 can be removed from the surface 100 (as shown in FIG. 5), and inverted to sit on the surface of surface 100. In this second orientation, the clip 400 supports the docking station 200 on the surface 100. This second orientation can position the aperture 220 on the front of the housing 205 at an obtuse angle relative to the surface of the surface 100. Such positioning is advantageous for easily viewing the screen of the portable electronic device 700 while it is sitting on the surface 100. It is preferable that the clip 400 be bendable so the user can adjust it to allow for a preferred orientation of the docking station 200 on the surface 100.

Figure 6:
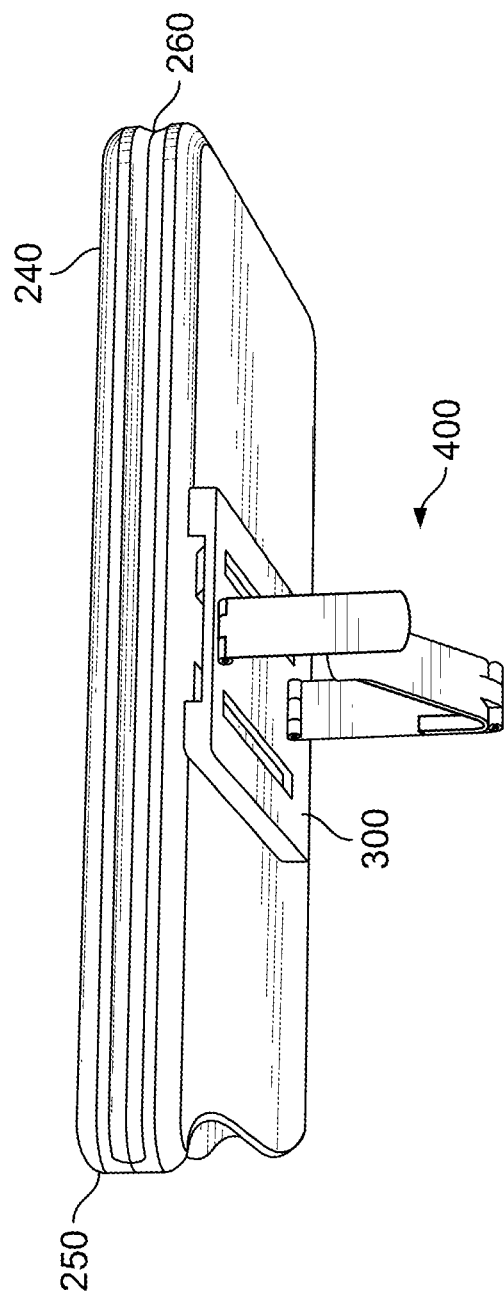
FIG. 6 is a top perspective view of the docking station showing a gutter according to one embodiment of the invention.

An important aspect of certain embodiments, as shown in FIGS. 5-6, is the gutter 260. The gutter 260 is in the form of a channel, and extends along at least a portion of the top of the housing 240. The gutter 260 is size and shaped to provide a fluid channel to trap and direct substances, such as fluid or food. The gutter 260 is important for embodiments of the invention that are attached to the edge of a table, as food and beverages can easily spill onto the housing 205. The gutter 260 prevents these substances from flowing into the apertures 220 on the front of the housing 205 and the aperture 210 on the side of the housing 205, and damaging the portable electronic device. Another aspect of the invention can include a spout 250 at the end of the gutter 260. The spout 250 is configured to direct any fluid or other substances out of the gutter 260 and away from the apertures 210 and 220 of the housing 205.

In another embodiment, the housing 205 described above with a first aperture 210 and at least a second aperture 220 includes a gutter 260 and at least one leg extending from the housing 205 to support the housing relative to a surface. In this embodiment, the docking station 200 sits on top of a surface 100. The gutter 260 forms a fluid channel, as described above, and can extend along the length of the top of the housing. A spout 250 can be added at one end of the gutter 260, and is used to direct any fluid out of the gutter 260 and clear of the apertures 210 and 220 in the housing 205. This embodiment is similar to the embodiment shown in FIG. 1, except that the end 240 of the housing 205 with the gutter 260 is oriented on top, rather than on the bottom, of the housing 205. The leg in this embodiment can be the same as, or different from the clip shown in FIGS. 2, 4, 4A and 6. Other aspects of this embodiment include detachably connecting the housing 205 to the surface 100 in a first orientation with a clip that has opposing surfaces. In this first orientation, the top surface of the housing 205 is substantially level with or below the surface 100 it is connected to, for the reasons discussed above. Another aspect of this embodiment allows for the docking station 200 to be position upon the surface 100 in a second orientation, such that the opposing surfaces of the clip support the housing. In this second orientation, the second aperture 220 can be at an obtuse angle relative to the surface of the surface 100, for the reasons discussed above.

Figure 7A:
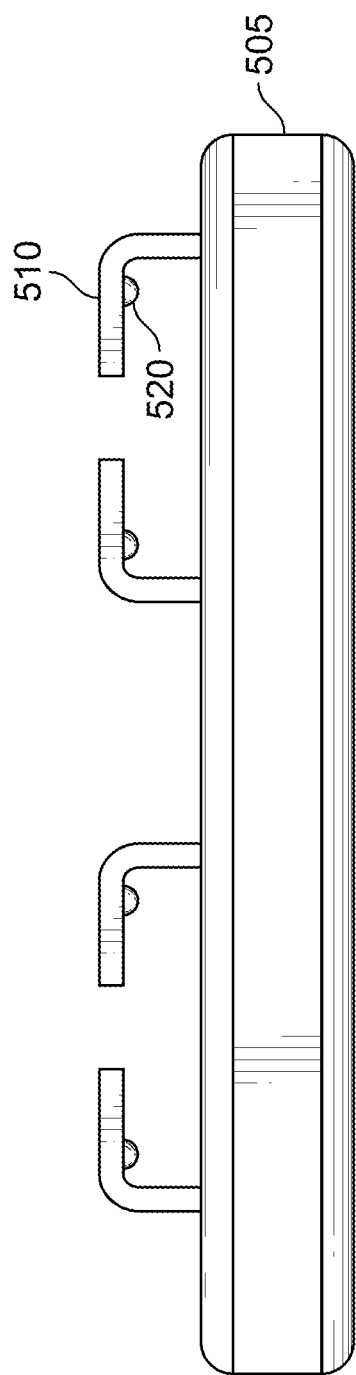
FIG. 7A is a side elevation view of the docking station showing a first and second clip holder according to one embodiment of the invention.
Figure 7B:
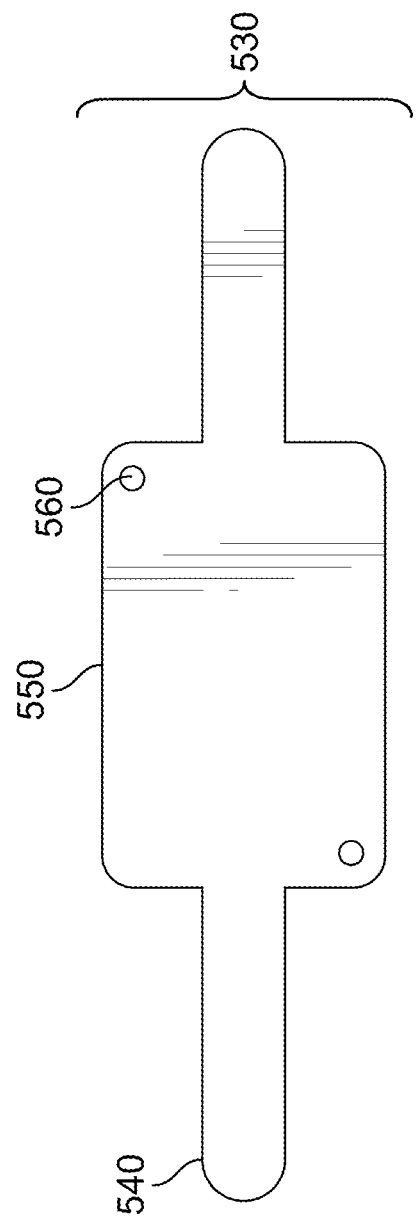
FIG. 7B is a plan view of a clip in an unfolded position according to one embodiment of the invention.

In accordance with the present invention, the clip 400 discussed above can consist of a clip system with a first and second clip 530, and a first and second clip holder 510, as depicted in FIGS. 7A and 7B. In this aspect of the invention, the edges 540 of the first and second clips 530 are narrower than the centers 550 of the first and second clips 530. The shape of such first and second clips is similar to a file folder fastener, which is known in the art. The first and second clip holders 510 are connected to the back of the housing 505 by any suitable connection method, including adhesive or plastic molding. Each clip holder 510 comprises opposing sides, which are preferably in the shape of a right angle to securely hold each clip 530. There is an opening between each side of each clip holder, which is adapted to allow the narrower edge 540 of the clip 530 to pass through the opening. When the clip 530 is in the clip holder 510, the broader center 550 of the clip 530 is secured to the clip holder 510 and is too broad to pass through the opening of the clip holder 510. When engaged in the clip holders 510, the narrower parts 540 of the clips 530 can be bent into a substantially U-shaped or V-shaped configuration to allow for connection to a surface's edge and to support the docking station when sitting on top of a surface. As discussed above, the clips 530 are preferably metal for durability reasons, but can be made of any suitable material that is sufficiently bendable and durable. For additional security, each clip holder 510 can have at least one raised portion 520, such as in the form of a raised circle. The clips 530 can have depressions 560 which are adapted to fit the raised portion 520 of the clip holder 510. When the clip 530 is moved into position in the clip holder 520, the raised portion 520 of the clip holder 510 will engage with the depression 560 in the clip 530 and lock the clip 530 into place. The raised portions 520 and depressions 560 can be placed in any suitable location on the clip holders and clips to facilitate this engagement. The raised portions 520 and depressions 560 are preferably shaped as halved spheres to allow for easy connection and secure engagement. The removable nature of the clips described in the above embodiments is advantageous for each cleaning.

Figure 8:
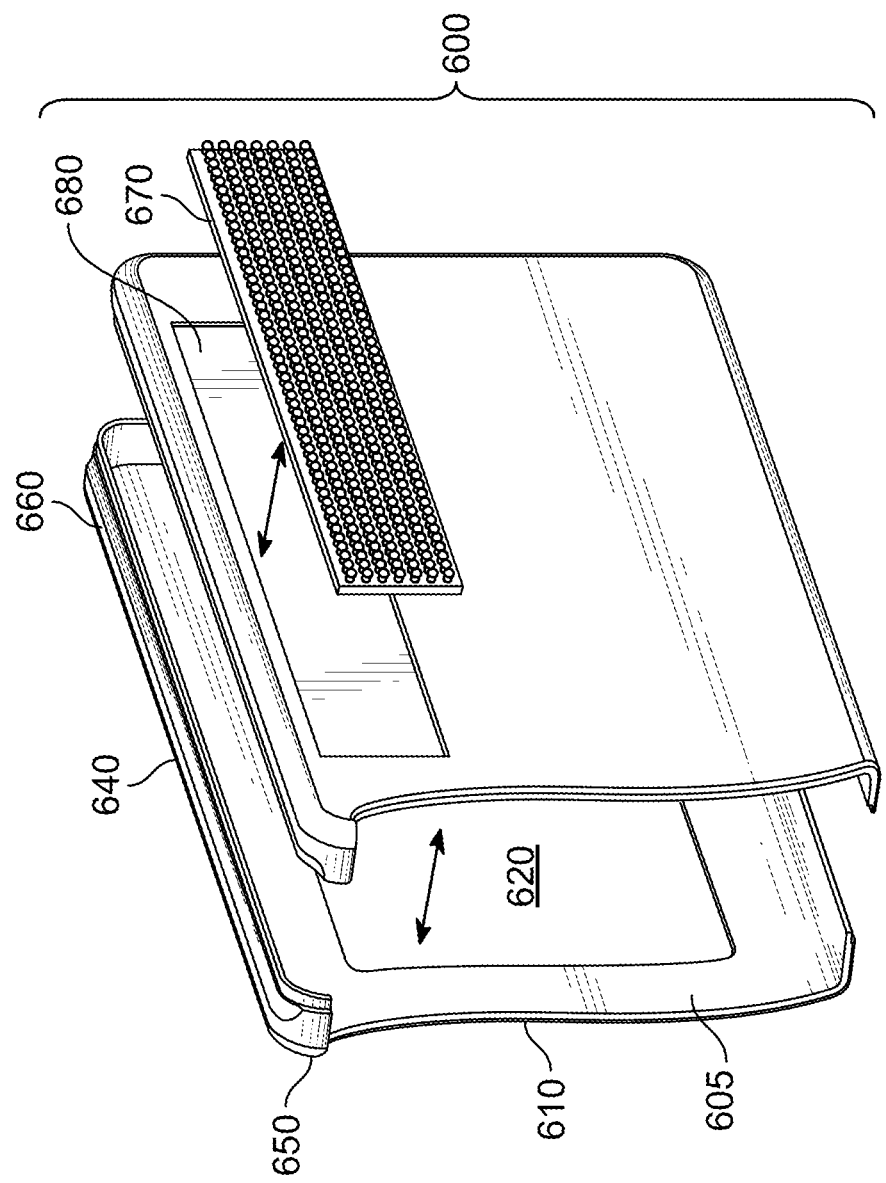
FIG. 8 is an exploded perspective view of the docking station with hook and loop fasteners according to a third embodiment of the invention.

In another embodiment, shown in FIG. 8, the docking station 600 consists of a housing 605 and a plurality of fasteners 670. The housing 605 can be one continuous piece, or a two-piece system that snaps together or engages by other suitable means. It is preferable that the housing be one continuous piece to minimize product assembly costs. In this embodiment, the housing 605 has a first aperture 610 that is sized and shaped to receive a portable electronic device. The housing 605 also contains at least a second aperture 620, which is sized and shaped to provide access to the touch sensitive display. The second aperture 620 is preferably placed on the front of the housing to allow easy access to the touch sensitive display. As described above, it is preferable to have a second and third aperture 620 in the front of the housing for proper support and to maximize access to the device's touch sensitive display. This embodiment includes a gutter 660 on the top of the housing 640, which provides a fluid channel for directing liquid away from the portable electronic device. A fastener component 670 is connected to the back of the housing 605. This fastener component 670 can be connected in a depression 680 in the housing 605. Utilizing a depression 680 instead of merely connecting the fasteners to the housing 605 is preferred because it allows for a closer connection of the housing 605 to a surface. The fastener component 670 provides a first set of at least one of hook and loops. This embodiment includes a second fastener component (not shown) with a second set of at least one of hook and loops, which can be attached to a surface, such as a table. The first set of hook and loop fasteners 670 are connectable to the second set of hook and loop fasteners to secure the docking station 600 in place. An advantage of using hook and loop fasteners is that it allows for easy and quick removal of the docking station 600 from a surface. While any suitable hook and loop fastener component can be used in the present invention, common brands of hook and loop fasteners include Velcro® and DuraGrip®. An additional aspect of this embodiment may include a spout 650 at one end of the gutter 660. The spout 650 is used to direct fluid out of the gutter's fluid channel and clear of the apertures 610 and 620.

The present invention is preferably used with a table, as an object of this invention is to provide a holder with easy access to a portable electronic device for use while at a restaurant or a meeting. However, it is appreciated that the invention could be used with any surface, including but not limited to a bar, counter or bookshelf. In certain embodiments, such as those pictured in FIGS. 5 and 8, the surface does not need to be flat to utilize the invention.

While the housings described above can be made out of any suitable material, they are preferably plastic. Plastic housings are inexpensive to manufacture, and easy to clean and disinfect. Plastic is also sufficiently durable to withstand continued use and will protect the portable electronic device in circumstances where the docking station falls or disconnects from the surface.

While the invention has been described in connection with certain embodiments, it is defined by the claims that accompany this description and is not to be read as being restricted to any one embodiment thereof.

What is claimed is:

1. A support adapted to house a portable electronic device having a touch sensitive display, comprising:
   a housing having an exterior, a first aperture sized, shaped and positioned to receive the portable electronic device, and a second aperture sized, shaped and positioned to provide access to the touch sensitive display when the portable electronic device is received in the housing;
   a gutter extending along at least a portion of the exterior of the housing and providing a fluid channel;
   a spout at one end of the gutter, the spout directing any fluid out of the fluid channel and clear of the first aperture; and
   at least one leg extending from the housing to support the housing relative to a surface.

2. The support of claim 1, wherein the leg comprises a clip, the clip including opposing surfaces arranged to detachably connect the housing to the surface in a first orientation.

3. The support of claim 2, wherein the clip includes structure configured to enable the clip to move between an operative condition in which the clip extends from the housing and a second condition in which the clip collapses into a storage configuration adjacent to the housing.

4. The support of claim 2, wherein the housing has a top surface and the first orientation positions the top surface of the housing substantially level with or below the surface it is connected to.

5. The support of claim 2, wherein one of the opposing surfaces of the clip is further arranged to support the housing upon the surface in a second orientation.

6. The support of claim 1, wherein the housing has a top surface and the gutter extends along the length of the top surface of the housing.

7. The support of claim 1, wherein the leg comprises a first and second clip, each having edges and a center, such that at least one edge of each clip is narrower than the center of each clip.

8. The support of claim 7, further comprising a first and a second clip holder connected to the back of the housing, the first and second clip holder each comprising opposing sides with an opening between the sides, wherein the opening is adapted to fit the narrower edge of the first and second clip such that the center of the clip is secured in the respective clip holder.

9. The support of claim 8, wherein the first and second clip holder each have at least one raised portion, and the first and second clip each have at least one depression adapted to fit the raised portion of the first and second clip holder, such that the raised portion of the first and second clip holder engages, respectively, with the depression in the first and second clip.

10. A support adapted to house a portable electronic device having a touch sensitive display, comprising:
    a housing having an exterior, a first aperture sized, shaped and positioned to receive the portable electronic device, and a second aperture sized, shaped and positioned to provide access to the touch sensitive display when the portable electronic device is received in the housing;
    at least a first clip extending from the housing to support the housing relative to a surface, the clip including opposing surfaces arranged to detachably connect the housing to the surface in a first orientation, wherein one of the opposing surfaces of the clip is further arranged to support the housing upon the surface in a second orientation, wherein, in the first orientation the housing is supported substantially level with or below the surface it is connected and in the second orientation the housing is supported upon the surface.

11. The support of claim 10, wherein the housing has a top surface and the first orientation positions the top surface of the housing substantially level with or below the surface it is connected to.

12. The support of claim 10, wherein the first clip includes structure configured to enable the clip to move between an operative condition in which the clip extends from the housing and a second condition in which the clip collapses into a storage configuration adjacent to the housing.

13. The support of claim 10, further comprising a gutter extending along at least a portion of the exterior of the housing and providing a fluid channel.

14. The support of claim 13, further comprising a spout at one end of the gutter, the spout directing any fluid out of the fluid channel and clear of the first aperture.

15. The support of claim 10, further comprising a second clip, wherein the first and second clip each have edges and a center, such that at least one edge of each clip is narrower than the center of each clip.

16. The support of claim 15, further comprising a first and a second clip holder connected to the back of the housing, the first and second clip holder each comprising opposing sides with an opening between the sides, wherein the opening is adapted to fit the narrower edge of the first and second clip such that the center of the clip is secured in the respective clip holder.

17. The support of claim 16, wherein the first and second clip holder each have at least one raised portion, and the first and second clip each have at least one depression adapted to fit the raised portion of the first and second clip holder, such that the raised portion of the first and second clip holder engages, respectively, with the depression in the first and second clip.

* * * * *